US012629910B2

(12) United States Patent
Huang

(10) Patent No.: US 12,629,910 B2
(45) Date of Patent: May 19, 2026

(54) OPENING AND SHAPING BOX BLANK OF PACKING BOX

(71) Applicant: Shanghai Soontrue Machinery Equipment Co., Ltd., Shanghai (CN)

(72) Inventor: Song Huang, Shanghai (CN)

(73) Assignee: Shanghai Soontrue Machinery Equipment Co., Ltd., Shanghai (CN)

( * ) Notice: Subject to any disclaimer, the term of this patent is extended or adjusted under 35 U.S.C. 154(b) by 0 days.

(21) Appl. No.: 19/018,720

(22) Filed: Jan. 13, 2025

(65) Prior Publication Data

US 2025/0353270 A1 Nov. 20, 2025

(30) Foreign Application Priority Data

May 20, 2024 (CN) ......................... 202410625120.4

(51) Int. Cl.

*B31B 50/00* (2017.01)
*B31B 50/07* (2017.01)
*B31B 50/80* (2017.01)
*B31B 120/30* (2017.01)

(52) U.S. Cl.

CPC .......... *B31B 50/003* (2017.08); *B31B 50/006* (2017.08); *B31B 50/07* (2017.08); *B31B 50/80* (2017.08); *B31B 2120/302* (2017.08)

(58) Field of Classification Search

CPC ..... B31B 50/003; B31B 50/07; B31B 50/006; B31B 50/80; B31B 50/26; B31B 2120/302

See application file for complete search history.

(56) References Cited

U.S. PATENT DOCUMENTS

| | | | | |
|---|---|---|---|---|
| 3,952,636 A * | 4/1976 | Reichert | B65B 43/185 | 493/207 |
| 4,998,910 A * | 3/1991 | Mohaupt | B31B 50/00 | 493/15 |
| 5,156,582 A * | 10/1992 | Thompson | B31B 50/262 | 493/123 |
| 6,764,436 B1 * | 7/2004 | Mazurek | B31B 50/804 | 493/122 |
| 7,510,517 B2 * | 3/2009 | Goodman | B31B 50/804 | 493/317 |
| 9,027,315 B2 * | 5/2015 | Tsutsumi | B65B 43/305 | 53/381.1 |
| 11,731,386 B2 * | 8/2023 | Kolodziey | B31B 50/262 | 493/162 |
| 11,780,197 B2 * | 10/2023 | Johnson | B31B 50/046 | 493/132 |
| 12,441,075 B2 * | 10/2025 | Lai | B31B 50/52 | |
| 2004/0168408 A1 * | 9/2004 | Spatafora | B65B 43/305 | 53/566 |
| 2007/0197364 A1 * | 8/2007 | Monti | B65H 3/0883 | 493/316 |

(Continued)

*Primary Examiner* — Thomas M Wittenschlaeger

(74) *Attorney, Agent, or Firm* — Fish & Richardson P.C.

(57) ABSTRACT

Example methods and apparatus for opening and shaping a box blank of a packing box are described. In one example method, a box blank is taken out in a way that a box body I is fixedly sucked, and then is moved to a box blank shaping station. A box body II of the box blank is fixed at the box blank shaping station. After the box body II is fixed, the box body I is moved relative to the box body II, and the box blank is opened and shaped after the box body I is moved to a predetermined position.

20 Claims, 7 Drawing Sheets

(56) References Cited

U.S. PATENT DOCUMENTS

| | | | | |
|---|---|---|---|---|
| 2007/0293383 | A1* | 12/2007 | Gebhardt | B31B 50/78 493/313 |
| 2008/0113856 | A1* | 5/2008 | Chen | B65B 43/265 493/313 |
| 2010/0204030 | A1* | 8/2010 | Pazdernik | B31B 50/07 493/317 |
| 2018/0126683 | A1* | 5/2018 | Johnson | B31B 50/046 |
| 2022/0134700 | A1* | 5/2022 | Kolodziey | B31B 50/80 493/162 |
| 2024/0083131 | A1* | 3/2024 | Lam | B31B 50/066 |
| 2025/0353271 | A1 | 11/2025 | Huang | |

* cited by examiner

OPENING AND SHAPING BOX BLANK OF PACKING BOX

CROSS-REFERENCE TO RELATED APPLICATIONS

This application claims priority to Chinese Patent Application No. 202410625120.4, filed on May 20, 2024, which is hereby incorporated by reference in its entirety.

TECHNICAL FIELD

This application relates to the field of packaging technologies, in particular, to the field of box packaging technologies, and more specifically, to a method for opening and shaping a box blank of a packing box.

BACKGROUND

During packaging, an automatic packaging device using carton boxes needs to open and shape stacked box blanks of carton boxes, and usually an automatic unpacking mechanism is adopted to automatically open the box blanks.

At present, methods for opening box blanks include vertical unpacking and horizontal unpacking. The vertical unpacking means that a stacked box blank is opened when the box blank is in a vertical posture (an opening of a shaped packing box faces upward). The horizontal unpacking means that a stacked box blank is opened when the box blank is in a horizontal posture (an opening of a shaped packing box is oriented perpendicular to a vertical direction). The vertical unpacking and the horizontal unpacking are implemented by a vertical unpacking machine and a horizontal unpacking machine respectively.

Unpacking methods include forward unpacking and reverse unpacking based on a box blank stacking method. After a box blank is shaped, a packing box includes four box body surfaces: a front surface (box body I), a back surface (box body II), a left side surface (box body III), and a right side surface (box body IV). A process of opening and shaping a box blank with the left side surface and the front surface coplanarly stacked is defined as forward unpacking, while a process of opening and shaping a box blank with the front surface and the right side surface coplanarly stacked is reverse unpacking. In the existing technology, the forward unpacking and the reverse unpacking are implemented by different unpacking machines respectively, and it is impossible for one unpacking machine to implement both the forward unpacking and the reverse unpacking.

Existing methods for opening and shaping a box blank are as follows (the following methods for opening and shaping a box blank are all described with forward unpacking as an example):

The first method for opening and shaping a box blank includes: A box body I of a box blank is sucked to take the box. In the process of taking the box, a box body III is extruded by an auxiliary shaping strip, so that the box body III rotates by 90° around a joint between the box body III and the box body I, and the box blank is opened and shaped. In this method, an action of opening and shaping the box blank is completed in the process of taking the box blank, and the opening and shaping of the box blank is completed after the box blank is taken out in place.

The second method for opening and shaping a box blank includes: A box body I and a box body III of a box blank are sucked to take the box. In the process of taking the box, a suction cup group that sucks the box body III rotates by 90° relative to a suction cup group that sucks the box body I, so that the box body III rotates by 90° around a joint between the box body III and the box body I, and the box blank is opened and shaped. This method is the same as the above-mentioned first method, and an action of opening and shaping the box blank is completed in the process of taking the box blank. The opening and shaping of the box blank is also completed after the box blank is taken out in place.

In each of the above-mentioned two methods for opening and shaping a box blank, the box body III rotates by 90° relative to the box body I to open and shape the box blank. In the process of opening the box blank, there is no support for a box body II or a box body IV of the box blank, and the box body II and the box body IV rotate with the turning of the box body III. The box body II and the box body IV are under a greater stress, which needs higher hardness of the box blank. When the hardness of the box blank is low, the box body II and the box body IV are very likely to be stressed and deformed, which leads to poor box blank opening and shaping effects and low efficiency of effective and successful unpacking.

The third method for opening and shaping a box blank includes: A box body I of a box blank is sucked to take the box. After the box is taken and moved in place, a box body II of the box blank is sucked, and the box body II of the box blank moves in a direction perpendicular to the box body I. At the same time, the box body I of the box blank moves in a direction parallel to the box body I of the box blank. After both the box body I and the box body II are moved in place, the box blank is opened and shaped.

The above-mentioned third method for opening and shaping a box blank, which opens the box blank in a way of mutual staggered motion of the box body I and the box body II of the box blank, has at least the following defects:

① Because both the box body I and the box body II of the box blank need to move, at least two action mechanisms are needed for execution, which may increase device costs compared with the above-mentioned first and second methods.

② During staggered motion of the box body I and the box body II of the box blank, a cooperation relationship between the two action mechanisms, that is, a moving speed of the box body I and a moving speed of the box body II, needs to be controlled. At present, commonly used packing boxes are cuboid packing boxes. Although a displacement of the box body I moving in a direction parallel to the box body I and a displacement of the box body II moving in a direction perpendicular to the box body I are the same, speeds of the box body I and the box body II are not the same, and the speeds need to be changed, which causes a control method for controlling linkage of the two action mechanisms to be complicated. Once the speeds of the box body I and the box body II are not compatible, the box blank may be deformed, resulting in poor box blank shaping effects or even failure of box blank shaping.

③ Because both the box body I and the box body II of the box blank need to move, there is no fixed benchmark in the process of opening and shaping the box blank, and the benchmark is always changing, which causes the difficulty in implementation and lowers efficiency of opening and shaping the box blank.

④ After the box blank is opened, a box leaf at an opening on a side of the shaped box blank needs to be folded. In the above-mentioned first and second methods for opening and shaping a box blank, a final shaping position of the box blank is relatively fixed, and the box leaf at the opening on the side of the box blank is folded at a box blank shaping position. A position of a box leaf folding mechanism is relatively fixed. When the dimension of the box blank changes, a benchmark of the box blank shaping position is unchanged, and there is no great change in the position, so that a box leaf folding mechanism can match through adaptive adjustment. However, in the third method, because the box body I of the box blank and the box body II of the box blank relatively move, when the dimension of the box blank changes, a shaping reference position of the box blank also changes, so that it is relatively difficult to adjust the position of the box leaf folding mechanism correspondingly, which takes a long time.

The fourth method for opening and shaping a box blank includes: A box body I of a box blank is sucked to take the box. After the box is taken and moved in place, the box body I of the box blank is relatively fixed, and a box body II of the box blank is sucked. The box body II of the box blank moves in a direction perpendicular to the box body I and a direction parallel to the box body I in a curve fitting way, and the box blank is opened and shaped after the box body II moves in place.

In the above-mentioned third method and fourth method, two action mechanisms are used to perform actions of box taking and unpacking, so that a box blank opening and shaping device has high costs. Especially in the third method, a box-taking action mechanism further needs to cooperate with an unpacking action mechanism to implement unpacking, and there is a need for high matching accuracy between the two action mechanisms, so that it is impossible to implement high-speed unpacking, which leads to low efficiency of effective and successful unpacking. In the fourth method, only after the box is taken in place can an action be performed to suck the box body II of the box blank to drive the box body II of the box blank to move, and the actions of box taking and unpacking are discontinuous, so that there is a certain interval, which leads to low unpacking efficiency.

SUMMARY

To overcome the defects and deficiencies in the above-mentioned existing technology, this application provides a method for opening and shaping a box blank of a packing box. An invention objective of this application is to solve the problems in the above-mentioned existing technology that an implementation device for a method for opening and shaping a box blank has high costs, there is a need for high control accuracy of the implementation device, the cooperation is complex, and unpacking efficiency is low because an action interval exists due to discontinuity between a box taking action and an unpacking action. A box blank according to this application is taken out in a way that a box body I is fixed and sucked, and then is moved to a box blank shaping station. A box body II of the box blank is fixed at the box blank shaping station. After the box body II is fixed, the box body I moves relative to the box body II, and the box blank is opened and shaped after the box body I moves in place. According to this application, box taking and unpacking are completed based on the box body I. The box body II is fixed when the box is taken in place, and the box body I can act immediately. This application can be implemented by one power mechanism, and an implementation device has low costs. Box taking and unpacking are performed based on the box body I, so that a box taking action and an unpacking action can be continuous, and there is no motion interval between the two actions, thereby improving an effective and successful unpacking rate. Only the motion of the box body I needs to be controlled, which is easier to implement.

To solve the problems existing in the above-mentioned existing technology, this application is implemented by the following technical solution.

This application provides a method for opening and shaping a box blank of a packing box. The method specifically includes:

S1: A box blank to be opened and shaped is taken out and moved in a way that a box body I is fixedly sucked.

S2: The box blank with the fixedly sucked box body I is moved to a box blank shaping station, and a box body II of the box blank is fixed to the box blank shaping station after the box blank is moved in place.

S3: After the box body II of the box blank is fixed, the fixedly sucked box body I is driven to move in a curved trajectory relative to the box body II, and the box blank is opened and shaped after the box body I is moved in place.

The box body I and the box body II are opposite side box bodies after the box blank is opened and shaped. In the process of driving the box body I to move in a curved trajectory relative to the box body II, the box body II always remains fixed and stationary, and the box body I is always parallel to the box body II. The curved trajectory is presented in a way that a projection of the box body I on a first plane gradually moves outward away from a projection of the box body II on the first plane, and a projection of the box body I on a second plane gradually coincides with a projection of the box body II on the second plane. The first plane is a surface perpendicular to the box body I and the box body II, and the second plane is a surface parallel to the box body I and the box body II.

Further preferably, the box blank shaping station is located at a front end of a shaped-box blank conveying path, and after the box blank is opened and shaped, the box body I and the box body II are released and are conveyed backward along the shaped-box blank conveying path.

Further preferably, after the box blank is opened and shaped, a center line of the box blank coincides with a center line of the shaped-box blank conveying path.

Further preferably, in step S2, the box body II of the box blank is fixed to the box blank shaping station by a stopper on a shaped-box blank conveying belt arranged on a side of the shaped-box blank conveying path. The stopper implements blocking at a joint between the box body II and a box body III or box body IV adjacent to the box body II, and the stopper prevents a displacement of the box body II along the shaped-box blank conveying path.

Further preferably, based on a conveying direction of the shaped-box blank conveying path, when the box body II is located at a rear end of the box body I in a stacked state of the box blank, an actuating mechanism drives a movable suction cup group to drive the box body I to move backward in a curved trajectory. In this case, the stopper is located at a rear end of the box body II. After the box blank is shaped, the shaped box blank is conveyed forward by the shaped-box blank conveying belt on both sides of the shaped-box blank conveying path.

Further preferably, based on a conveying direction of the shaped-box blank conveying path, when the box body II is located at a front end of the box body I in a stacked state of the box blank, an actuating mechanism drives a movable suction cup group to drive the box body I to move forward in a curved trajectory, and in this case, the stopper is located at a front end of the box body II; and after the box blank is shaped, the shaped box blank is conveyed forward by the shaped-box blank conveying belt on both sides of the shaped-box blank conveying path.

Further preferably, the curved trajectory is a trajectory of a quarter-circle arc with a length of a box body III or box body IV adjacent to the box body II as a radius and a center of a joint between the box body II and the box body III or box body IV adjacent to the box body II as a circle center.

Further preferably, at the box blank shaping station, after the box blank is opened and shaped, a box leaf at an opening at an end of the shaped box blank is folded to seal the opening.

Further preferably, in steps S1, S2, and S3, the motion of the box body I is implemented by one actuating mechanism driving a movable suction cup group. The actuating mechanism at least drives the movable suction cup group to move in two directions, and the two directions are a direction parallel to the box body I and the box body II and a direction perpendicular to the box body I and the box body II.

Further preferably, the actuating mechanism is a two-axis parallel manipulator or a serial manipulator.

Further preferably, the actuating mechanism is an XY-axis operating module or a cross sliding table operating module.

Further preferably, in step S2, the box body II of the box blank is fixed to the box blank shaping station by a fixed suction cup group arranged on a side of the box blank shaping station, and the box body II of the box blank is sucked and fixed to the box blank shaping station by the fixed suction cup group.

Further preferably, in step S2, the box blank with the fixedly sucked box body I is moved to the box blank shaping station, the fixed suction cup group extends toward the box body II after the box blank is moved in place, and a suction cup of the fixed suction cup group is in contact with the box body II to suck and fix the box body II by vacuum negative pressure.

Further preferably, when the shaped box blank has a rectangular cross section, the box body I and the box body II are long-side box bodies of the box blank.

Compared with the existing technology, this application has the following beneficial effects:

1. Compared with the first and second methods shown in the background, the method for opening and shaping a box blank according to this application implements the opening and shaping of the box blank through staggered separation of the box body I and the box body II. In the opening and shaping process, the box body III and the box body IV are subjected to no extrusion force and thus cannot be deformed. If the box body III and the box body IV are deformed in the original box blank, the box body III and the box body IV can be straightened through the staggered separation of the box body I and the box body II to correct the deformation.
2. Compared with the third method shown in the background, in the method for opening and shaping a box blank according to this application, the box body II is fixed and stationary, and only motion of the box body I needs to be controlled, so that the motion of the box body I can be controlled more easily, and the action can be implemented faster. Two actuating mechanisms are not needed, so that the implementation device has lower costs. That is, compared with the existing third method, this application is easy to implement and control and has higher unpacking efficiency, and the implementation device has lower costs.
3. Compared with the third method shown in the background, in this application, there is a reference benchmark for the position at which the box blank is opened and shaped. The reference benchmark does not change no matter what the dimension of a box blank is. In the third method, both the box body I and the box body II relatively move, and the position of the reference benchmark changes based on box blanks with different dimensions. As the position of the reference benchmark changes, the positions of subsequent mechanisms such as a box leaf folding mechanism for unpacking and shaping need to be adjusted, causing the whole adjustment to be relatively difficult. The reference benchmark of this application remains unchanged, so that there is no need to adjust the positions of subsequent mechanisms such as the box leaf folding mechanism, which is more conducive to the implementation and layout of the structure.
4. Compared with the fourth method shown in the background, in the method for opening and shaping a box blank according to this application, actions are always performed through the box body I, and the box blank is taken out and opened by one actuating mechanism, so that the actions are simpler. The box taking action and the unpacking action are implemented more easily and more continuously, so that there is no action interval between the box taking action and the unpacking action. The unpacking action is performed immediately after the box taking without waiting for execution of a relevant mechanism in place, so that there is no waiting interval, which causes unpacking efficiency of the method according to this application to be higher.
5. The method for opening and shaping a box blank according to this application has wide applicability and is not affected by a box blank material. For a box blank in cases such as a soft material, a thin box body, damp, and repeated use, the method for opening and shaping a box blank according to this application can implement the effective shaping of the above-mentioned box blank and ensure an effective and successful unpacking rate.
6. The method for opening and shaping a box blank according to this application is not affected by a box blank stacking state, and can be applied to forward unpacking and reverse unpacking. An unpacking device implemented by the method according to this application can be applied to both forward unpacking and reverse unpacking, and switching between the forward unpacking and the reverse unpacking only lies in a difference in the moving direction of the box body I relative to the box body II, with no need to change the implementation structure. Only a corresponding selection of a control program of the implementation structure is needed.
7. In the method for opening and shaping a box blank according to this application, the box blank shaping station is located at the front end of the shaped-box blank conveying path. The box blank can be conveyed to a next process immediately after being opened and shaped, so that the implementation structure is compact and the actions are continuous, and an action interval between the box blank opening and shaping and the conveying of the box blank is reduced, thereby effectively improving box blank opening and shaping and conveying efficiency. Especially, after the box blank is opened and shaped, the center line of the box blank coincides with the center line of the shaped-box blank conveying path, thereby ensuring centering of the box blank after the box blank is opened and shaped, preventing deflection during conveying of the box blank after the box blank is opened and shaped, and further improving the box blank opening and shaping and conveying efficiency.

8. An existing device for opening the box blank is equipped with a shaped-box blank conveying belt, and a stopper is arranged on the shaped-box blank conveying belt to fix the box body II, so that a displacement of the box body II in the conveying direction of the shaped-box blank conveying path is limited, which has lower implementation costs and remarkable effects. Forward unpacking and reverse unpacking are implemented based on different unpacking directions. The forward unpacking and reverse unpacking can be switched only by controlling the position of the stopper of the shaped-box blank conveying belt, with no need to adjust the implementation structure. The switching between the forward unpacking and the reverse unpacking does not increase costs of the implementation device.
9. A motion trajectory of the box body I according to this application can be approximately a trajectory of a quarter-circle arc with a length of a box body III or box body IV adjacent to the box body II as a radius and a center of a joint between the box body II and the box body III or box body IV adjacent to the box body II as a circle center. The motion trajectory of the box body I is implemented relatively simply, which further simplifies the control program for controlling the motion of the box body I, lowers a need for manufacturing accuracy of the box blank itself, and allows a specified manufacturing error in the box blank.
10. In this application, the motion of the box body I is implemented by one actuating mechanism driving the movable suction cup group, so that the implementation structure is simple and has low costs, and the continuity of the box taking action and the unpacking action can be effectively ensured. The actuating mechanism is a planar actuating mechanism in two directions, and is preferably a two-axis manipulator or a serial manipulator, which has higher accuracy, is easier to implement and control and occupies less space.
11. In this application, the fixed suction cup group is used to fix the box body II, and the implementation structure is simple and easy to implement, can achieve a very good fixing effect, and can realize a displacement of the box body II in any direction in space, so as to ensure that the box body II is effectively fixed during the opening of the box blank. When the box body III and/or the box body IV needs to be straightened and corrected, the fixed suction cup group can cooperate with the movable suction cup group that pulls the box body I, so as to straighten and correct the box body III and/or the box body IV. The motion trajectory of the box body I can be diversified to copy with the opening and shaping of the box blank in different cases.
12. In this application, a long-side box body is preferably used as a reference box body for opening and shaping of the box blank, so as to ensure stability, high efficiency and a high success rate of opening and shaping the box blank.

REFERENCE SIGNS

1. Box blank, 2. Box body I, 3. Box body II, 4. Box body III, 5. Box body IV, 6. Box blank shaping station, 7. Shaped-box blank conveying path, 8. Shaped-box blank conveying belt, 9. Stopper, 10. Actuating mechanism, 11. Movable suction cup group, 12. Fixed suction cup group, 13. Box blank storage warehouse.

DESCRIPTION OF EMBODIMENTS

The following are exemplary embodiments of this application as described by the claims and their equivalents, in conjunction with the accompanying drawings, to assist in a comprehensive understanding. The specific details are to be regarded as exemplary only and do not limit the scope of this application. Therefore, a person of ordinary skill in the art can make various changes and modifications to the embodiments without departing from the scope and spirit of this application.

Embodiment 1

As a preferred embodiment of this application, referring to FIG. 1, FIG. 2, FIG. 3, and FIG. 4 of the specification, this embodiment discloses a method for opening and shaping a box blank of a packing box. The method specifically includes:

S1: A box blank 1 to be opened and shaped is taken out and moved in a way that a box body I 2 is fixedly sucked.

S2: The box blank 1 with the fixedly sucked box body I 2 is moved to a box blank shaping station 6, and a box body II 3 of the box blank 1 is fixed to the box blank shaping station 6 after the box blank is moved in place.

S3: After the box body II 3 of the box blank 1 is fixed, the fixedly sucked box body I 2 is driven to move in a curved trajectory relative to the box body II 3, and the box blank 1 is opened and shaped after the box body I 2 is moved in place.

The box body I 2 and the box body II 3 are opposite side box bodies after the box blank 1 is opened and shaped. In the process of driving the box body I 2 to move in a curved trajectory relative to the box body II 3, the box body II 3 always remains fixed and stationary, and the box body I 2 is always parallel to the box body II 3. The curved trajectory is presented in a way that a projection of the box body I 2 on a first plane gradually moves outward away from a projection of the box body II 3 on the first plane, and a projection of the box body I 2 on a second plane gradually coincides with a projection of the box body II 3 on the second plane. The first plane is a surface perpendicular to the box body I 2 and the box body II 3, and the second plane is a surface parallel to the box body I 2 and the box body II 3.

Figure 1:
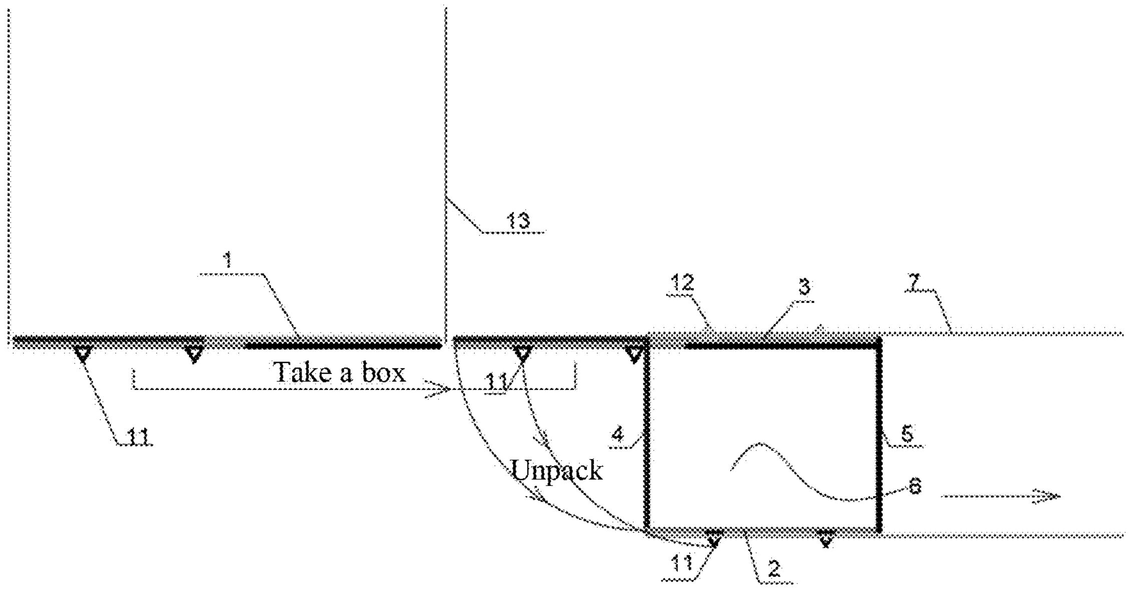
FIG. 1 is a first schematic flowchart illustrating a method for opening and shaping a box blank, according to this application.
Figure 2:
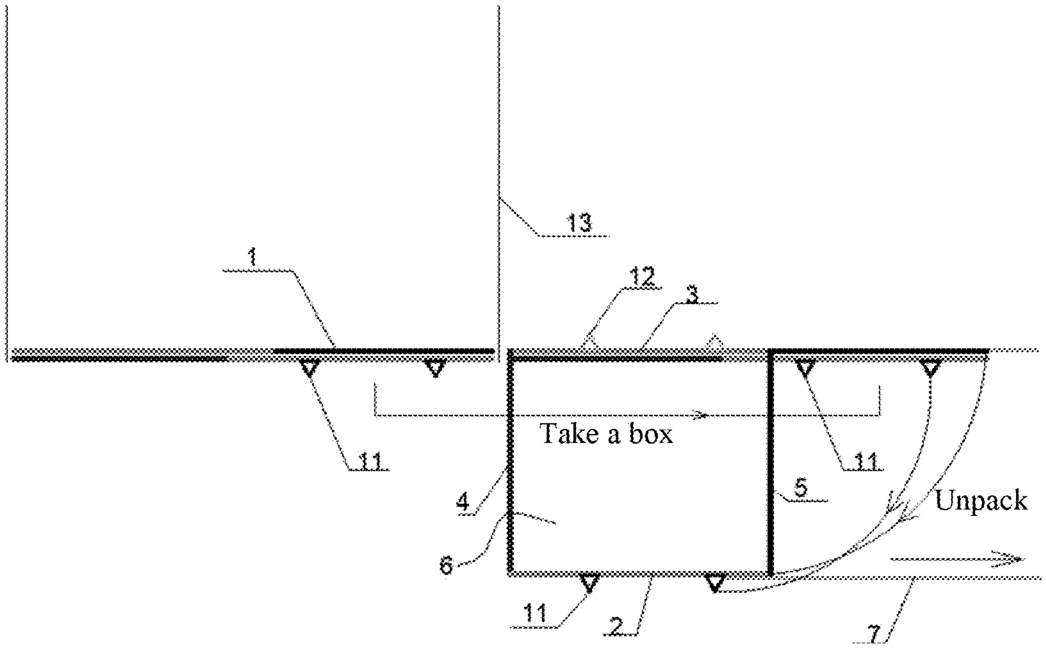
FIG. 2 is a second schematic flowchart illustrating a method for opening and shaping a box blank, according to this application.

As an implementation of this embodiment, referring to FIG. 1 and FIG. 2 of the specification, the box body II 3 is fixed by a fixed suction cup group 12 arranged on a side of the box blank shaping station 6. A specific implementation process is as follows:

- S1: A box blank 1 to be opened and shaped is taken out and moved in a way that the box body I 2 is fixedly sucked.
- S2: The box blank 1 with the fixedly sucked box body I 2 is moved to the box blank shaping station 6, and the box body II 3 of the box blank 1 is fixedly sucked by the fixed suction cup group 12 at the box blank shaping station 6 after the box blank is moved in place.
- S3: After the box body II 3 of the box blank 1 is fixed, the fixedly sucked box body I 2 is driven to move in a curved trajectory relative to the box body II 3, and the box blank 1 is opened and shaped after the box body I 2 is moved in place.

As an example of this embodiment, referring to FIG. 1 of the specification, a process of opening and shaping a box blank shown in FIG. 1 is forward unpacking, and a process of opening and shaping a box blank shown in FIG. 2 is reverse unpacking. By a comparison between FIG. 1 and FIG. 2, the forward unpacking and the reverse unpacking can be switched only by changing a moving direction of the box body I 2 based on a stacking state of the box blank 1, and the switching between the forward unpacking and the reverse unpacking can be implemented only by changing the control of motion of the box body I 2, without hardware adjustment. The position of the box blank shaping station 6 remains unchanged.

Figure 3:
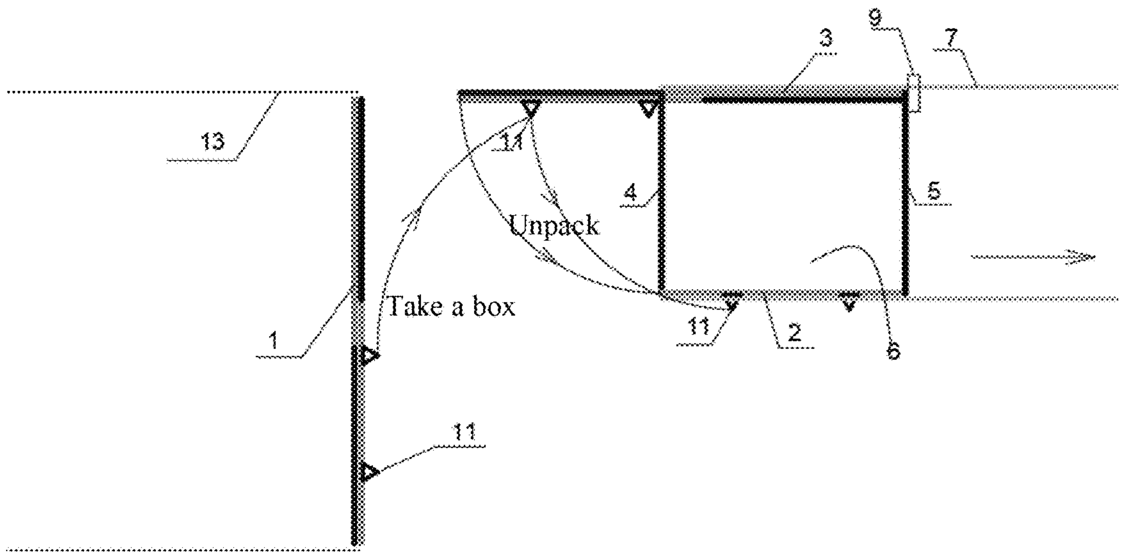
FIG. 3 is a third schematic flowchart illustrating a method for opening and shaping a box blank, according to this application.
Figure 4:
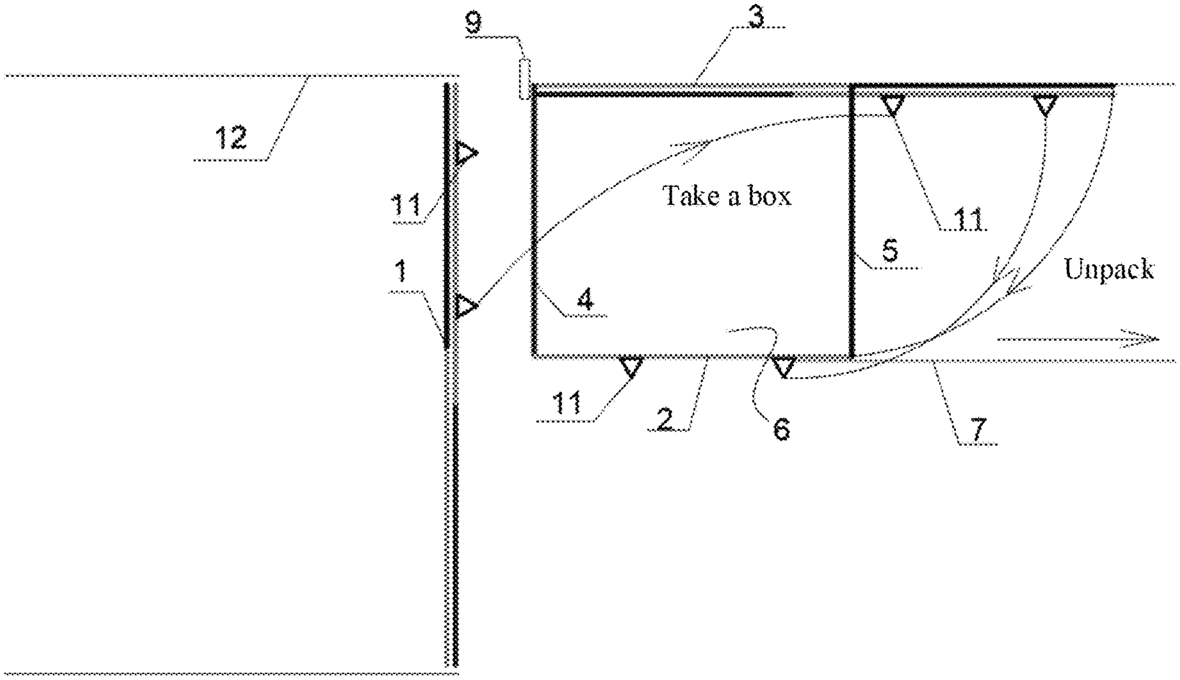
FIG. 4 is a fourth schematic flowchart illustrating a method for opening and shaping a box blank, according to this application.

As another implementation of this embodiment, referring to FIG. 3 and FIG. 4 of the specification, the box body II 3 is fixed by a blocking fixing member arranged on a side of the box blank shaping station 6. In this implementation, the blocking fixing member limits a displacement of the box blank 1 in a lengthwise direction of the box body II 3, and a displacement of the box blank 1 in a height direction of the box body II 3 can be limited by a box leaf folding mechanism. A position at which the blocking fixing member is mounted is determined based on a folding state of the box blank 1, and is subject to a conveying direction of the shaped box blank 1 (conveyed from front to back). During forward conveying shown in FIG. 3 of the specification, the blocking fixing member is located at a rear end of the box body II 3. During reverse unpacking shown in FIG. 4 of the specification, the blocking fixing member is located at a front end of the box body II 3.

Embodiment 2

Figure 5:
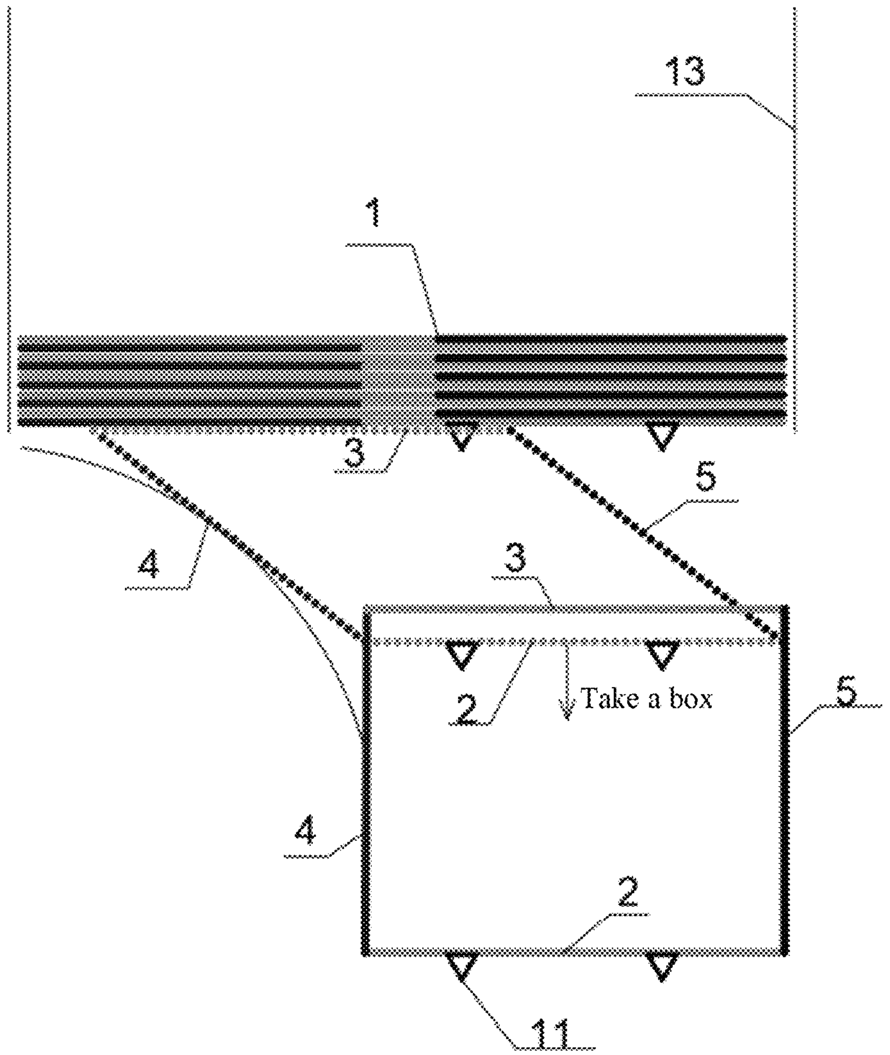
FIG. 5 is a schematic diagram illustrating a first method for opening and shaping a box blank in the background, according to this application.
Figure 6:
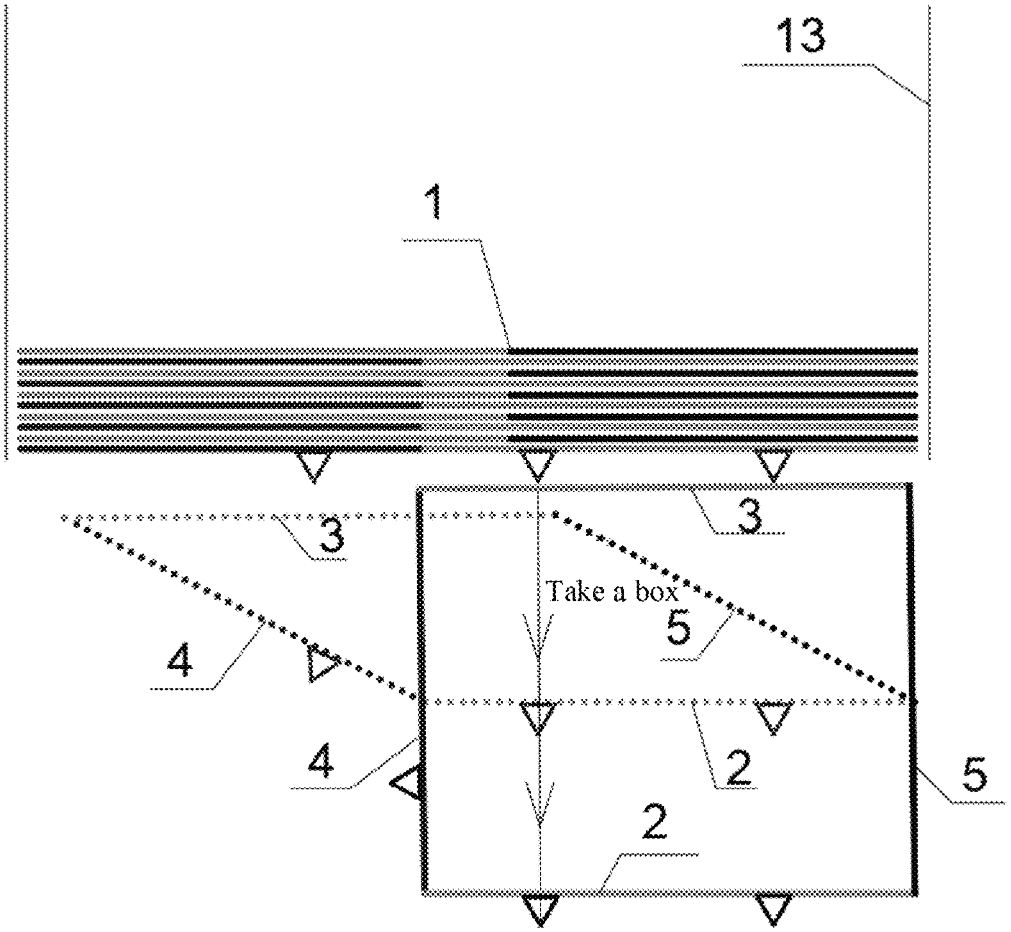
FIG. 6 is a schematic diagram illustrating a second method for opening and shaping a box blank in the background, according to this application.

As a comparative embodiment of this application, referring to FIG. 5 and FIG. 6 of the specification, this embodiment is an implementation of the existing technology. A method for opening and shaping a box blank shown in FIG. 5 includes: A box body I 2 of a box blank 1 is sucked to take the box. In the process of taking the box, a box body III 4 is extruded by an auxiliary shaping strip, so that the box body III 4 rotates by 90° around a joint between the box body III and the box body I 2, and the box blank 1 is opened and shaped. In this method, an action of opening and shaping the box blank 1 is completed in the process of taking the box blank 1, and the opening and shaping of the box blank 1 is completed after the box blank 1 is taken out in place.

A method for opening and shaping a box blank shown in FIG. 6 includes: A box body I 2 and a box body III 4 of a box blank 1 are sucked to take the box. In the process of taking the box, a suction cup group that sucks the box body III 4 rotates by 90° relative to a suction cup group that sucks the box body I 2, so that the box body III 4 rotates by 90° around a joint between the box body III and the box body I 2, and the box blank 1 is opened and shaped. This method is the same as the above-mentioned method shown in FIG. 5, and an action of opening and shaping the box blank 1 is completed in the process of taking the box blank 1. The opening and shaping of the box blank 1 is also completed after the box blank 1 is taken out in place.

In each of the methods shown in FIG. 5 and FIG. 6, the box body III 4 rotates by 90° relative to the box body I 2 to open and shape the box blank 1. In the process of opening the box blank 1, there is no support for a box body II 3 or a box body IV 5 of the box blank 1, and the box body II 3 and the box body IV 5 rotate with the turning of the box body III 4. The box body II 3 and the box body IV 5 are under a greater stress, which needs higher hardness of the box blank 1. When the hardness of the box blank 1 is low, the box body II 3 and the box body IV 5 are very likely to be stressed and deformed, which leads to poor box blank opening and shaping effects and low efficiency of effective and successful unpacking.

A method for opening the box blank 1 according to this application includes: The box blank 1 to be opened and shaped is taken out and moved in a way that the box body I 2 is fixedly sucked. The box blank 1 with the fixedly sucked box body I 2 is moved to the box blank shaping station 6. After the box blank is moved in place, the box body II 3 of the box blank 1 is fixed to the box blank shaping station 6. After the box body II 3 of the box blank 1 is fixed, the fixedly sucked box body I 2 is driven to move in a curved trajectory relative to the box body II 3. After the box body I 2 moves in place, the box blank 1 is opened and shaped.

The box body I 2 and the box body II 3 are opposite side box bodies after the box blank 1 is opened and shaped. In the process of driving the box body I 2 to move in a curved trajectory relative to the box body II 3, the box body II 3 always remains fixed and stationary, and the box body I 2 is always parallel to the box body II 3. The curved trajectory is presented in a way that a projection of the box body I 2 on a first plane gradually moves outward away from a projection of the box body II 3 on the first plane, and a projection of the box body I 2 on a second plane gradually coincides with a projection of the box body II 3 on the second plane. The first plane is a surface perpendicular to the box body I 2 and the box body II 3, and the second plane is a surface parallel to the box body I 2 and the box body II 3.

The method for opening and shaping a box blank according to this application implements the opening and shaping of the box blank 1 through staggered separation of the box body I 2 and the box body II 3. In the opening and shaping process, the box body III 4 and the box body IV 5 are subjected to no extrusion force and thus cannot be deformed. If the box body III 4 and the box body IV 5 are deformed in the original box blank 1, the box body III 4 and the box body IV 5 can be straightened through the staggered separation of the box body I 2 and the box body II 3 to correct the deformation. Compared with the methods for opening and shaping a box blank shown in FIG. 5 and FIG. 6, the method for opening and shaping a box blank according to This application lowers a need for hardness of the box blank 1, and can be applied to box blanks 1 with different hardness and materials. Moreover, the effective and successful unpacking rate can be effectively ensured.

Embodiment 3

Figure 7:
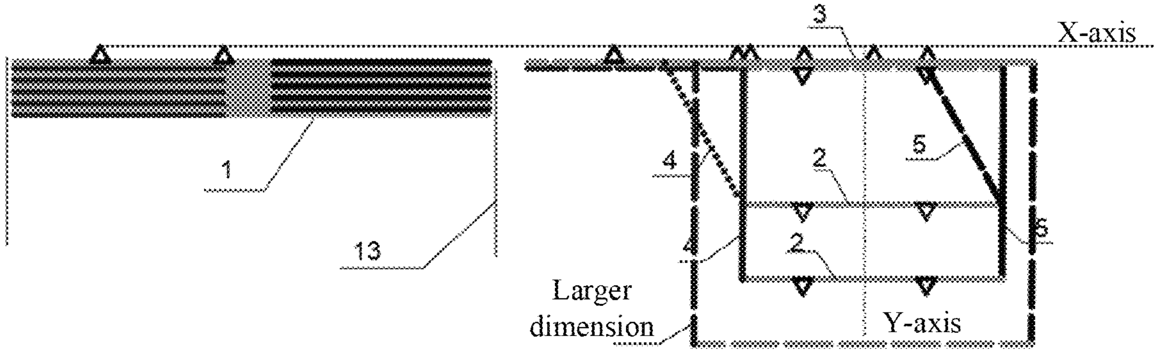
FIG. 7 is a schematic diagram illustrating a third method for opening and shaping a box blank in the background, according to this application.

As another comparative embodiment of this application, an unpacking method shown in FIG. 7 of the specification includes: A box body II 3 of a box blank 1 is sucked to take the box. After the box is taken and moved in place, a box body I 2 of the box blank 1 is sucked, and the box body I 2 of the box blank 1 moves in a direction perpendicular to the box body II 3. In addition, the box body II 3 of the box blank 1 moves in a direction parallel to the box body II 3 of the box blank 1. A displacement of box body I 2 is described as an X-axis, and a displacement of the box body II 3 is described as a Y-axis. After both the box body II 3 and the box body I 2 are moved in place, the box blank 1 is opened and shaped. At least two motion mechanisms are needed. One of the motion mechanisms drives the box body I 2 to move along the X-axis, and the other motion mechanism drives the box body II 3 to move along the Y-axis. The displacements of the box body I 2 and the box body II 3 are the same, and each are a length of a box body III 4 and/or a box body IV 5. For the motion of the box body I 2 and the box body II 3, not only the lengths of the box body III 4 and/or the box body IV 5 are considered, but also the lengths of the box body I 2 and the box body II 3 are considered, so as to control an X-axis displacement rate and a Y-axis displacement rate, ensure position accuracy of the X-axis motion mechanism to suck the box body I 2, and ensure position accuracy of the Y-axis motion mechanism to suck the box body II 3, otherwise the shaped box blank 1 may be deformed.

However, in the actual implementation process, there may be a certain error between box blanks 1 with the same dimension, so that it is difficult to ensure accurate positions at which the X-axis motion mechanism and the Y-axis motion mechanism are fixed, and thus it is impossible to ensure a shaping effect of the box blanks 1.

Similarly, based on different positions of the X-axis motion mechanism and the Y-axis motion mechanism relative to a fixed box body, action cooperation between the X-axis motion mechanism and the Y-axis motion mechanism cannot be fixed, and can only be determined when the positions of the X-axis motion mechanism and the Y-axis motion mechanism relative to the fixed box body are accurate. The action cooperation between the X-axis motion mechanism and the Y-axis motion mechanism cannot be adjusted adaptively. Therefore, this method needs higher motion accuracy of an actuating mechanism 10 and high machining accuracy of the box blank 1, so that it is difficult to implement cooperation between the X-axis motion mechanism and the Y-axis motion mechanism, and the implementation structure is difficult to control.

In the concrete implementation process of the method for opening and shaping a box blank shown in FIG. 7, the X-axis motion mechanism and the Y-axis motion mechanism rather than the box blank 1 are used as a reference benchmark. That is, after the box blanks with different dimensions are shaped, the box blanks each are shaped based on one of the axes, and the position of a center line of the shaped box blank is changed regardless of the X-axis or the Y-axis. In addition, for each of the box blanks 1 with different dimensions, the position of the front end and the position of the rear end of the shaped box blank 1 are changed, and the center line of the shaped box blank is also changed, which is not conducive to the adjustment of a box leaf folding mechanism and the adaptation of a shaped-box blank conveying mechanism. After the dimension change, the box leaf folding mechanism and the shaped-box blank conveying mechanism are greatly adjusted.

Moreover, due to the difficulty in cooperation between the above-mentioned X-axis motion mechanism and Y-axis motion mechanism, it takes a lot of time to debug the X-axis motion mechanism and the Y-axis motion mechanism after the dimension of the box blank 1 is changed, so that the box blank 1 with a changed dimension can be better shaped.

Figure 9:
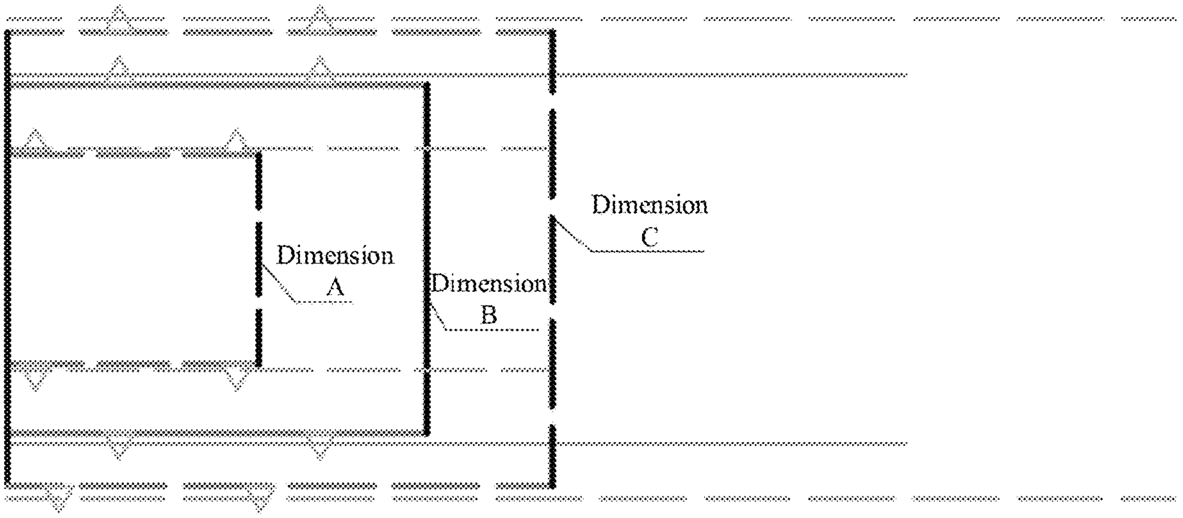
FIG. 9 is a schematic diagram illustrating opening and shaping of box blanks with different dimensions by using a method for opening and shaping a box blank, according to this application.
Figure 10:
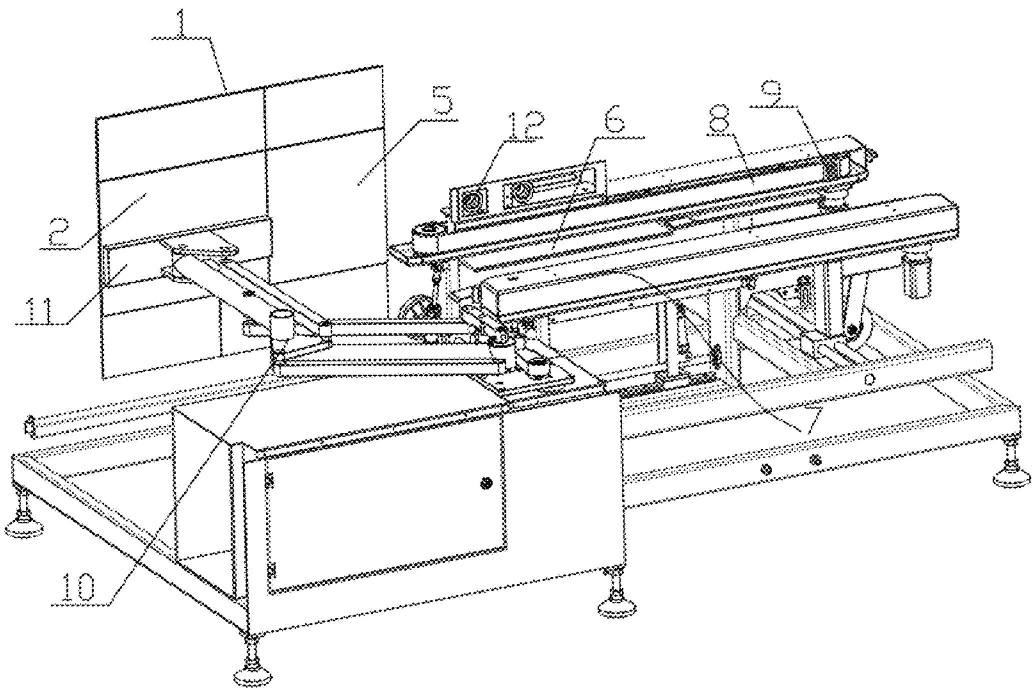
FIG. 10 is a perspective view illustrating an implementation structure in a method for opening and shaping a box blank of a packing box, according to this application.
Figure 11:
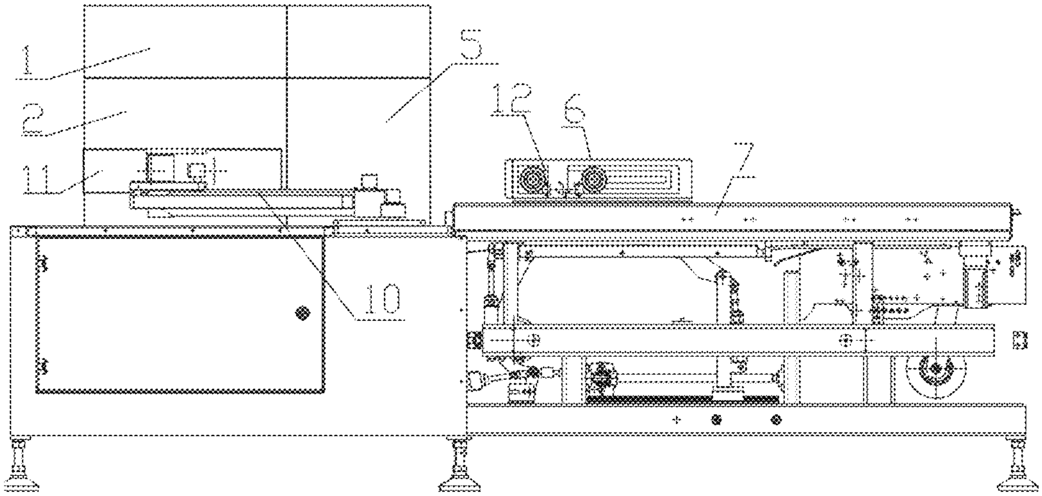
FIG. 11 is a schematic structural front view illustrating the implementation structure shown in FIG. 9, according to this application.
Figure 12:
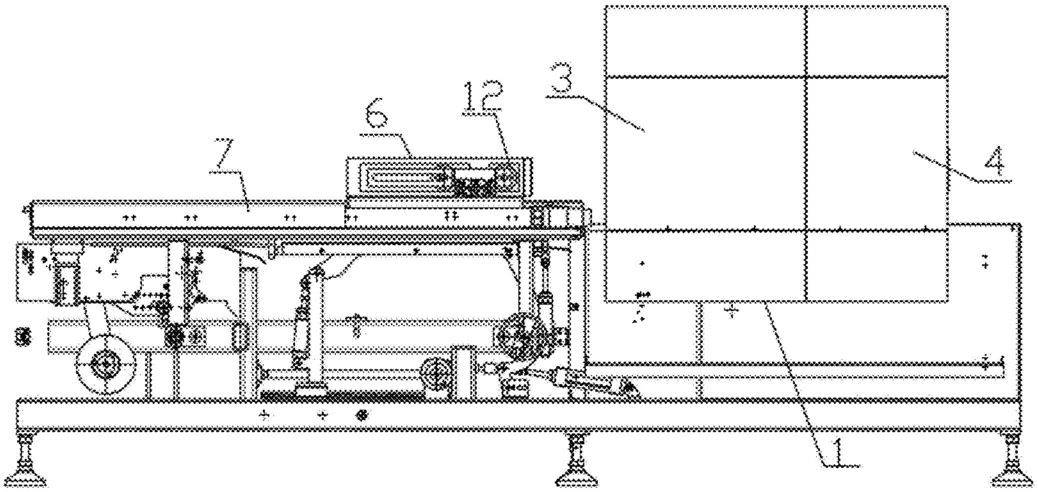
FIG. 12 is a schematic structural rear view illustrating the implementation structure shown in FIG. 9, according to this application.
Figure 13:
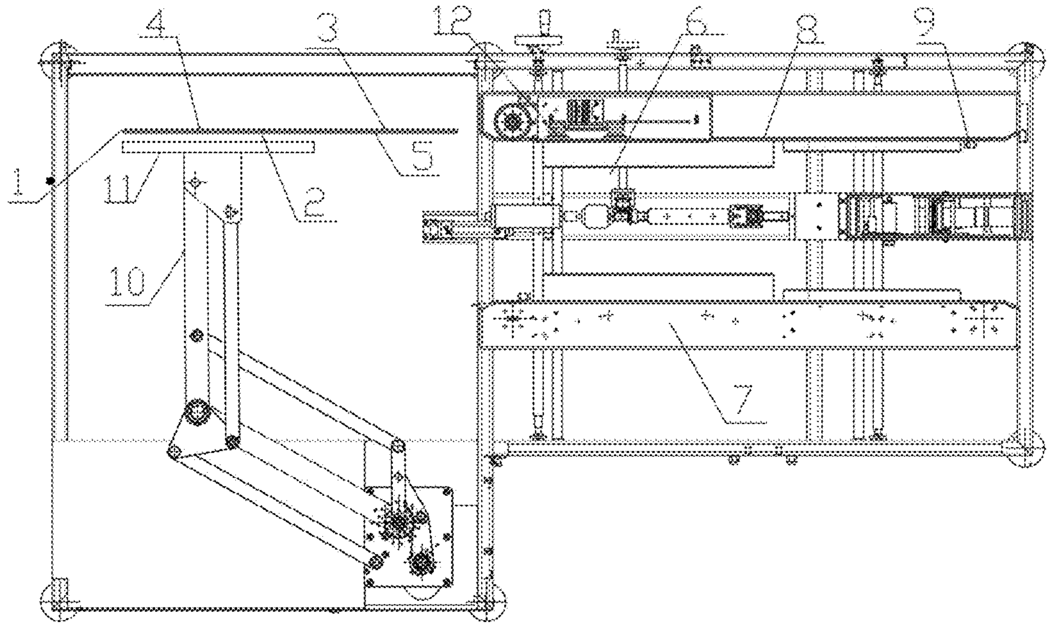
FIG. 13 is a schematic structural top view illustrating the implementation structure shown in FIG. 9, according to this application.

Compared with the method for opening and shaping a box blank shown in FIG. 7, this application has the following advantages: This application can be implemented by using one actuating mechanism 10, thereby reducing costs of an implementation device. In this application, only motion of the box body I 2 needs to be controlled, and thus it is easier to implement and control. In this application, both box taking and unpacking are implemented by using the box body I 2, and there is no limitation on the position at which the box body I 2 is fixedly sucked, provided that the box body I2 can be fixedly sucked. The reference benchmark of this application is always the center line of the shaped box blank (refer to FIG. 9 of the specification), and only centering adjustment is needed, so that the adjustment after the box blank dimension change is simpler. A motion benchmark of the box body I 2 is always the box body II 3, that is, joints between both ends of the box body II 3 and the box body III 4 and the box body IV 5. This motion benchmark remains unchanged. During the motion of the box body I 2 relative to the box body II 3, the box body II 3 always remains unchanged, and the motion benchmark also remains unchanged. The box body I 2 always performs curved motion with the joints between both ends of the box body II 3 and the box body III 4 and the box body IV 5 as circle centers, and there is no limitation on the position at which the actuating mechanism 10 sucks the box body I 2. Therefore, the implementation is simpler, and there is no high need for accuracy of the sucking position of the actuating mechanism 10, provided that firm suction can be implemented. When a motion trajectory of the box body I 2 is fitted, only the lengths of the box body III 4 and the box body IV 5 need to be considered, without additionally considering the position at which the box body I 2 is fixedly sucked.

In addition, in this application, the box body I2 moves, with a simple motion trajectory and a higher motion rate, thus improving the efficiency of box blank opening and shaping.

Embodiment 4

Figure 8:
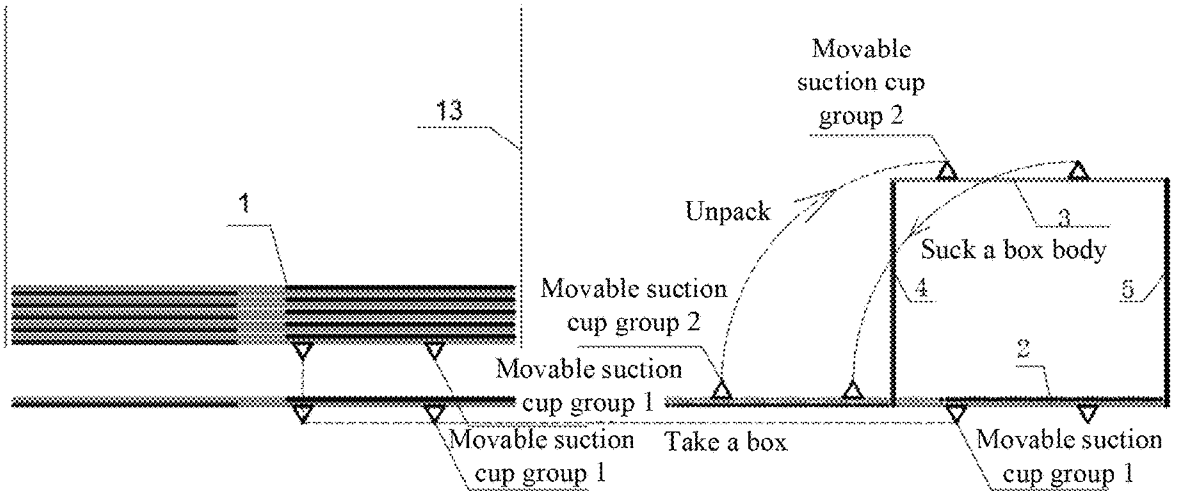
FIG. 8 is a schematic diagram illustrating a fourth method for opening and shaping a box blank in the background, according to this application.

As another comparative embodiment of this application, referring to FIG. 8 of the specification, a method for opening and shaping a box blank shown in FIG. 8 includes: A box body I 2 of a box blank 1 is sucked to take the box. After the box is taken and moved in place, the box body I 2 of the box blank 1 is relatively fixed, and a box body II 3 of the box blank 1 is sucked. The box body II 3 of the box blank 1 moves in a direction perpendicular to the box body I 2 and a direction parallel to the box body I 2 in a curve fitting way, and the box blank 1 is opened and shaped after the box body II moves in place.

Referring to FIG. 8 of the specification, at least two motion mechanisms are necessarily needed for implementation. That is, one of the motion mechanisms needs to perform the action of "sucking the box body I 2 of the box blank 1 to take the box and moving the box in place", and the second motion mechanism needs to perform the action of "sucking the box body II 3 and driving the box body II 3 to move relative to the box body I 2 to open the box blank 1". From the perspective of the implementation structure, the method shown in FIG. 8 has high implementation costs.

From the perspective of an implementation action, in the method shown in FIG. 8, it is needed to wait until the box body II 3 moves in place, and then the second motion mechanism sucks the box body II 3 and then drive the box body II 3 to move. Generally, when a motion mechanism is configured, an initial position may be provided for the motion mechanism, so that after the box body II 3 moves in place, the second motion mechanism moves from the initial position to the box body II 3 to suck the box body II 3. During the implementation of the method shown in FIG. 8, when the box body II 3 moves in place, it is needed to wait for the second actuating mechanism 10 to move to the box body II 3 to suck the box body II 3, so that there is a time interval for waiting for moving of the second actuating mechanism 10 in place between the action of taking the box in place and the unpacking action.

In this application, a box body on which the box taking operation and the unpacking operation are performed is the box body I 2. When the box blank 1 is moved in place, the box body II 3 can be sucked, and the box body I 2 can immediately start the unpacking action. The action interval between the box taking action and the unpacking action is almost negligible, which greatly shortens the time, enhances the continuity of actions, reduces costs of the implementation structure, and improves the unpacking efficiency.

Embodiment 5

As another preferred embodiment of this application, this embodiment is a further detailed supplement and elaboration of the technical solution of this application based on Embodiment 1. In this embodiment, referring to FIG. 1, FIG. 2, FIG. 3, and FIG. 4 of the specification, based on Embodiment 1, the box blank shaping station 6 is located at a front end of a shaped-box blank conveying path 7, and after the box blank 1 is opened and shaped, the box body I 2 and the box body II 3 are released and are conveyed backward along the shaped-box blank conveying path 7. After the box blank 1 is opened and shaped, a center line of the box blank 1 coincides with a center line of the shaped-box blank conveying path 7.

In this embodiment, the box blank shaping station 6 is located at the front end of the shaped-box blank conveying path 7. The box blank 1 can be conveyed to a next process immediately after being opened and shaped, so that the implementation structure is compact and the actions are continuous, and an action interval between the box blank opening and shaping and the conveying of the box blank 1 is reduced, thereby effectively improving box blank opening and shaping and conveying efficiency. Especially, after the box blank 1 is opened and shaped, the center line of the box blank 1 coincides with the center line of the shaped-box blank conveying path 7, thereby ensuring centering of the box blank 1 after the box blank is opened and shaped, preventing deflection during conveying of the box blank 1 after the box blank 1 is opened and shaped, and further improving the box blank opening and shaping and conveying efficiency.

As an implementation of this embodiment, referring to FIG. 3 and FIG. 4 of the specification, in step S2, the box body II 3 of the box blank 1 is fixed to the box blank shaping station 6 by a stopper 9 on a shaped-box blank conveying belt 8 arranged on a side of the shaped-box blank conveying path 7. The stopper 9 implements blocking at a joint between the box body II 3 and a box body III 4 or box body IV 5 adjacent to the box body II, and the stopper 9 prevents a displacement of the box body II 3 along the shaped-box blank conveying path 7.

As an example of this implementation, referring to FIG. 3 of the specification, based on a conveying direction of the shaped-box blank conveying path 7, when the box body II 3 is located at a rear end of the box body I 2 in a stacked state of the box blank 1, an actuating mechanism 10 drives a movable suction cup group 11 to drive the box body I 2 to move backward in a curved trajectory. In this case, the stopper 9 is located at a rear end of the box body II 3. After the box blank 1 is shaped, the shaped box blank 1 is conveyed forward by the shaped-box blank conveying belt 8 on both sides of the shaped-box blank conveying path 7.

As another example of this implementation, referring to FIG. 4 of the specification, based on a conveying direction of the shaped-box blank conveying path 7, when the box body II 3 is located at a front end of the box body I 2 in a stacked state of the box blank 1, an actuating mechanism 10 drives a movable suction cup group 11 to drive the box body I 2 to move forward in a curved trajectory. In this case, the stopper 9 is located at a front end of the box body II 3. After the box blank 1 is shaped, the shaped box blank 1 is conveyed forward by the shaped-box blank conveying belt 8 on both sides of the shaped-box blank conveying path 7.

An existing device for opening the box blank 1 is equipped with a shaped-box blank conveying belt 8, and a stopper 9 is arranged on the shaped-box blank conveying belt 8 to fix the box body II 3, so that a displacement of the box body II 3 in the conveying direction of the shaped-box blank conveying path 7 is limited, which has lower implementation costs and remarkable effects. Forward unpacking and reverse unpacking are implemented based on different unpacking directions. The forward unpacking and the reverse unpacking can be switched only by controlling the position of the stopper 9 of the shaped-box blank conveying belt 8, with no need to adjust the implementation structure. The switching between the forward unpacking and the reverse unpacking does not increase costs of the implementation device.

As another implementation of this embodiment, the curved trajectory is a trajectory of a quarter-circle arc with a length of a box body III 4 or box body IV 5 adjacent to the box body II 3 as a radius and a center of a joint between the box body II 3 and the box body III 4 or box body IV 5 adjacent to the box body II as a circle center. The motion trajectory of the box body I 2 is implemented relatively simply, which further simplifies the control program for controlling the motion of the box body I 2, lowers a need for manufacturing accuracy of the box blank 1 itself, and allows a specified manufacturing error in the box blank 1.

As another implementation of this embodiment, at the box blank shaping station 6, after the box blank 1 is opened and shaped, a box leaf at an opening at an end of the shaped box blank 1 is folded to seal the opening. Therefore, an action of shaping the box blank 1 and the box leaf folding action are continuous, which is beneficial to improving the overall efficiency of the box blank opening and shaping and bottom sealing.

Embodiment 6

As another preferred embodiment of this application, this embodiment is a further detailed supplement and elaboration of the technical solution of this application based on Embodiment 1 or Embodiment 5. In this embodiment, referring to FIG. 10, FIG. 11, FIG. 12, and FIG. 13 of the specification, in steps S1, S2, and S3, the motion of the box body I 2 is implemented by one actuating mechanism 10 driving a movable suction cup group 11. The actuating mechanism 10 at least drives the movable suction cup group 11 to move in two directions, and the two directions are a direction parallel to the box body I 2 and the box body II 3 and a direction perpendicular to the box body I 2 and the box body II 3.

As an example of this implementation, the actuating mechanism 10 is a two-axis parallel manipulator or a serial manipulator.

As an example of this implementation, the actuating mechanism 10 is an XY-axis operating module or a cross sliding table operating module.

The motion of the box body I 2 is implemented by one actuating mechanism 10 driving the movable suction cup group 11, so that the implementation structure is simple and has low costs, and the continuity of the box taking action and the unpacking action can be effectively ensured. The actuating mechanism 10 is a planar actuating mechanism 10 in two directions, and is preferably a two-axis manipulator or a serial manipulator, which has higher accuracy, is easier to implement and control and occupies less space.

As another implementation of this embodiment, in step S2, the box body II 3 of the box blank 1 is fixed to the box blank shaping station 6 by a fixed suction cup group 12 arranged on a side of the box blank shaping station 6, and the box body II 3 of the box blank 1 is sucked and fixed to the box blank shaping station 6 by the fixed suction cup group 12.

In step S2, the box blank 1 with the fixedly sucked box body I 2 is moved to the box blank shaping station 6, the fixed suction cup group 12 extends toward the box body II 3 after the box blank is moved in place, and a suction cup of the fixed suction cup group 12 is in contact with the box body II 3 to suck and fix the box body II 3 by vacuum negative pressure.

In this embodiment, the fixed suction cup group 12 is used to fix the box body II 3, and the implementation structure is simple and easy to implement, can achieve a very good fixing effect, and can realize a displacement of the box body II 3 in any direction in space, so as to ensure that the box body II 3 is effectively fixed during the opening of the box blank 1. When the box body III 4 and/or the box body IV 5 needs to be straightened and corrected, the fixed suction cup group 12 can cooperate with the movable suction cup group 11 that pulls the box body I 2, so as to straighten and correct the box body III 4 and/or the box body IV 5. The motion trajectory of the box body I 2 can be diversified to copy with the opening and shaping of the box blank 1 in different cases.

When the shaped box blank 1 has a rectangular cross section, the box body I 2 and the box body II 3 are long-side box bodies of the box blank 1. A long-side box body is preferably used as a reference box body for opening and shaping of the box blank, so as to ensure stability, high efficiency and a high success rate of opening and shaping the box blank.

Embodiment 7

As another preferred embodiment of this application, this embodiment is a further detailed supplement and elaboration of the technical solution of this application based on Embodiment 1, Embodiment 5, or Embodiment 6.

As an implementation of this embodiment, referring to FIG. 1 and FIG. 2 of the specification, when an arrangement direction of a box blank storage warehouse 13 is perpendicular to the shaped-box blank conveying path 7, the actuating mechanism 10 drives the movable suction cup group 11 to move to a front end of the box blank storage warehouse 13 to suck a box blank 1 located at the front end of the box blank storage warehouse 13, specifically to suck the box body I 2 of the box blank 1 (if the shaped box blank 1 has a rectangular cross section, with regard to the box body I 2, it is preferred to suck a long-side box body of the box blank 1, or it can be chosen to suck a short-side box body of the box blank 1, and comparatively, sucking the long-side box body has a better unpacking and shaping effect and a higher unpacking and shaping success rate).

The actuating mechanism 10 drives the movable suction cup to convey backward the box blank 1 sucked by the movable suction cup along the shaped-box blank conveying path 7 by a distance until the box body II 3 on the other side can be sucked by the fixed suction cup group 12.

During the specific implementation, if the structure allows, the box body I 2 sucked by the movable suction cup group 11 shown in FIG. 1 can partially overlap the box blank storage warehouse 13, as long as it is ensured that the box body II 3 on the opposite side of the box body I 2 sucked by the movable suction cup group 11 can be sucked by the fixed suction cup group 12. A distance by which the box blank 1 moves relative to the fixed suction cup group 12 is shortened as much as possible, to improve unpacking efficiency of the box blank 1.

When the actuating mechanism 10 drives the movable suction cup group 11 to move the box blank 1 sucked by the movable suction cup group to the position of the fixed suction cup group 12, the actuating mechanism 10 can drive the movable suction cup group 11 to move toward the fixed suction cup group 12 by a specified distance. That is, the box blank 1 exerts a certain force on the fixed suction cup group 12 to ensure that the fixed suction cup group 12 can firmly suck the box body II 3 of the box blank 1, or the fixed suction cup group 12 extends by a length toward the box body II 3 (the position can be maintained after being sucked or reset after being sucked), so as to ensure that the fixed suction cup group 12 can firmly suck the box body II 3 of the box blank 1. After the fixed suction cup group 12 sucks the box body II 3, the actuating mechanism 10 moves to drive the box body I 2 sucked by the movable suction cup group 11 to move in a curved trajectory, and the box blank 1 is opened and shaped.

As another implementation of this embodiment, referring to FIG. 3 and FIG. 4 of the specification, when an arrangement direction of a box blank storage warehouse 13 is parallel to the shaped-box blank conveying path 7, the actuating mechanism 10 drives the movable suction cup group 11 to move to a front end of the box blank storage warehouse 13 to suck a box blank 1 located at the front end of the box blank storage warehouse 13, specifically to suck the box body I 2 of the box blank 1. Then the actuating mechanism 10 drives the movable suction cup to act to turn the box blank 1 by 90° until the box body II 3 on the other side can be sucked by the fixed suction cup group 12. Other actions are similar to those shown in the first implementation of this embodiment.

Embodiment 8

As another preferred embodiment of this application, this embodiment is a further detailed supplement and elaboration of the technical solution of this application based on Embodiment 1, Embodiment 5, Embodiment 6, or Embodiment 7.

As an implementation of this embodiment, a method for opening and shaping a box blank of a packing box shown in this application is applied to a vertical packing machine. FIG. 1, FIG. 2, FIG. 3, and FIG. 4 are top views illustrating application of the method according to this application to a vertical unpacking machine. When the structure shown in FIG. 10, FIG. 11, FIG. 12, and FIG. 13 is applied to a vertical unpacking machine, an effective shaping and unpacking rate of the vertical unpacking machine is improved, a shaping effect of the box blank 1 is good, a need for a material of the box blank 1 is low, and a vertical unpacking device has low costs.

As another implementation of this embodiment, the method for opening and shaping a box blank of a packing box disclosed in this application is applied to a horizontal unpacking machine. FIG. 1, FIG. 2, FIG. 3, and FIG. 4 are front views illustrating application of the method according to this application to a horizontal unpacking machine. The structural layout shown in FIG. 1 is similar to that of an existing horizontal packing machine structure, except that a two-axis parallel manipulator or a serial manipulator is used instead of box taking and unpacking, and the fixed suction cup group 12 is arranged above the shaped-box blank conveying path 7. Compared with the existing horizontal unpacking machine, the application of this application is beneficial to simplifying the structure of the horizontal unpacking machine, reducing device costs, and improving unpacking efficiency.

In the layout shown in FIG. 2, in the existing horizontal unpacking machine, the horizontally stacked box blank storage warehouse 13 can be changed to horizontally and vertically place box blanks 1. Then a box is taken and rotated by 90°, so that the box blank 1 is horizontal. After the box blank 1 moves horizontally in place, the fixed suction cup group 12 sucks the box body II 3, and the box body I 2 moves downward in a curved trajectory to open the box blank 1.

This application can be suitable for forward unpacking and reverse unpacking when applied to vertical unpacking machines or horizontal unpacking machines, and the switching between forward unpacking and reverse unpacking is simple.

Although the concept of this application has been specifically shown and described with reference to exemplary embodiments of this application, it should be understood by a person skilled in the art that various changes in form and details can be made therein without departing from the spirit and scope of this application as described in the claims.

What is claimed is:

1. A method for opening and shaping a box blank of a packing box, comprising:
- taking out and moving a box blank, wherein a box body I of the box blank is fixedly sucked;
- moving the box blank with the fixedly sucked box body I to a box blank shaping station;
- fixing, with a stopper on the box blank shaping station, a box body II of the box blank to the box blank shaping station after the box blank is moved to the box blank shaping station, the stopper configured to implement blocking at a joint between the box body II and a box body III or box body IV adjacent to the box body II;
- driving, after the box body II of the box blank is fixed to the box blank shaping station, the fixedly sucked box body I to move along a curved trajectory relative to the box body II; and
- opening and shaping the box blank after the box body I is moved to a predetermined position along the curved trajectory relative to the box body II,
- wherein the box body I and the box body II are positioned on two opposite sides of the box blank after the box blank is opened and shaped;
- wherein in the process of driving the box body I to move in the curved trajectory relative to the box body II, the box body II remains fixed to the box blank shaping station and stationary, and the box body I is parallel to the box body II; and
- wherein the curved trajectory is configured such that a projection of the box body I on a first plane gradually moves outward away from a projection of the box body II on the first plane, and that a projection of the box body I on a second plane gradually coincides with a projection of the box body II on the second plane, wherein the first plane is a surface perpendicular to the box body I and the box body II, and the second plane is a surface parallel to the box body I and the box body II.

2. The method for opening and shaping a box blank of a packing box according to claim 1, wherein:
- the box blank shaping station is located at a front end of a shaped-box blank conveying path, and
- the method further comprises:
  - after the box blank is opened and shaped, releasing and conveying the box body I and the box body II backward along the shaped-box blank conveying path.

3. The method for opening and shaping a box blank of a packing box according to claim 2, wherein after the box blank is opened and shaped, a center line of the box blank coincides with a center line of the shaped-box blank conveying path.

4. The method for opening and shaping a box blank of a packing box according to claim 2, wherein in the process of moving the box blank with the fixedly sucked box body I to the box blank shaping station, the box body II of the box blank is fixed to the box blank shaping station by the stopper on a shaped-box blank conveying belt arranged on a side of the shaped-box blank conveying path, and wherein the stopper is configured to prevent a displacement of the box body II along the shaped-box blank conveying path.

5. The method for opening and shaping a box blank of a packing box according to claim 4, further comprising:

based on a conveying direction of the shaped-box blank conveying path, when the box body II is located at a rear end of the box body I in a stacked state of the box blank, driving, using an actuating mechanism, a movable suction cup group to drive the box body I to move backward in a curved trajectory, wherein the stopper is located at a rear end of the box body II; and after the box blank is shaped, conveying, using the shaped-box blank conveying belt, the shaped box blank forward on both sides of the shaped-box blank conveying path.

6. The method for opening and shaping a box blank of a packing box according to claim 4, further comprising:

based on a conveying direction of the shaped-box blank conveying path, when the box body II is located at a front end of the box body I in a stacked state of the box blank, driving, using an actuating mechanism, a movable suction cup group to drive the box body I to move forward in a curved trajectory, wherein the stopper is located at a front end of the box body II; and after the box blank is shaped, conveying the shaped box blank forward on both sides of the shaped-box blank conveying path.

7. The method for opening and shaping a box blank of a packing box according to claim 1, wherein the curved trajectory is a trajectory of a quarter-circle arc, and wherein the quarter-circle arc has a radius of a length of a box body III or box body IV adjacent to the box body II, and the quarter-circle arc has a circle center being a center of a joint between the box body II and the box body III or box body IV adjacent to the box body II.

8. The method for opening and shaping a box blank of a packing box according to claim 1, further comprising:

at the box blank shaping station, after the box blank is opened and shaped, folding a box leaf at an opening at an end of the shaped box blank to seal the opening.

9. The method for opening and shaping a box blank of a packing box according to claim 1, wherein motion of the box body I is controlled by one actuating mechanism driving a movable suction cup group, the actuating mechanism at least drives the movable suction cup group to move in two directions, and the two directions are a direction parallel to the box body I and the box body II and a direction perpendicular to the box body I and the box body II.

10. The method for opening and shaping a box blank of a packing box according to claim 9, wherein the actuating mechanism is a two-axis parallel manipulator or a serial manipulator.

11. The method for opening and shaping a box blank of a packing box according to claim 9, wherein the actuating mechanism is an XY-axis operating device or a cross sliding table operating device.

12. The method for opening and shaping a box blank of a packing box according to claim 1, wherein in the process of fixing the box body II of the box blank to the box blank shaping station, the box body II of the box blank is fixed to the box blank shaping station by a fixed suction cup group arranged on a side of the box blank shaping station, and the box body II of the box blank is sucked and fixed to the box blank shaping station (6) by the fixed suction cup group.

13. The method for opening and shaping a box blank of a packing box according to claim 12, wherein in the process of moving the box blank with the fixedly sucked box body I to the box blank shaping station, the box blank with the fixedly sucked box body I is moved to the box blank shaping station, the fixed suction cup group extends toward the box body II after the box blank is moved to the box blank shaping station, and a suction cup of the fixed suction cup group is in contact with the box body II to suck and fix the box body II by vacuum negative pressure.

14. The method for opening and shaping a box blank of a packing box according to claim 1, wherein when the shaped box blank has a rectangular cross section, the box body I and the box body II are long-side box bodies of the box blank.

15. A method for opening and shaping a box blank of a packing box, comprising:

taking out and moving a box blank, wherein a box body I of the box blank is fixedly sucked;

moving the box blank with the fixedly sucked box body I to a box blank shaping station;

fixing, with a stopper on the box blank shaping station, a box body II of the box blank to the box blank shaping station after the box blank is moved to the box blank shaping station, the stopper configured to implement blocking at a joint between the box body II and a box body III or box body IV adjacent to the box body II;

driving, after the box body II of the box blank is fixed to the box blank shaping station, the fixedly sucked box body I to move along a curved trajectory relative to the box body II; and opening and shaping the box blank after the box body I is moved to a predetermined position along the curved trajectory relative to the box body II.

16. The method for opening and shaping a box blank of a packing box according to claim 15, wherein:

the box body I and the box body II are positioned on two opposite sides of the box blank after the box blank is opened and shaped;

in the process of driving the box body I to move in the curved trajectory relative to the box body II, the box body II remains fixed to the box blank shaping station and stationary, and the box body I is parallel to the box body II; and the curved trajectory is configured such that a projection of the box body I on a first plane gradually moves outward away from a projection of the box body II on the first plane, and that a projection of the box body I on a second plane gradually coincides with a projection of the box body II on the second plane, wherein the first plane is a surface perpendicular to the box body I and the box body II, and the second plane is a surface parallel to the box body I and the box body II.

17. The method for opening and shaping a box blank of a packing box according to claim 15, wherein:

the box blank shaping station is located at a front end of a shaped-box blank conveying path, and the method further comprises:

after the box blank is opened and shaped, releasing and conveying the box body I and the box body II backward along the shaped-box blank conveying path.

18. The method for opening and shaping a box blank of a packing box according to claim 17, wherein after the box blank is opened and shaped, a center line of the box blank coincides with a center line of the shaped-box blank conveying path.

19. The method for opening and shaping a box blank of a packing box according to claim 17, wherein in the process of moving the box blank with the fixedly sucked box body I to the box blank shaping station, the box body II of the box blank is fixed to the box blank shaping station by the stopper on a shaped-box blank conveying belt arranged on a side of the shaped-box blank conveying path, and wherein the stopper is configured to prevent a displacement of the box body II along the shaped-box blank conveying path.

20. A method for opening and shaping a box blank of a packing box, comprising:

taking out and moving a box blank, wherein a box body I of the box blank is fixedly sucked;

moving the box blank with the fixedly sucked box body I to a box blank shaping station;

fixing, with a stopper on the box blank shaping station, a box body II of the box blank to the box blank shaping station after the box blank is moved to the box blank shaping station, the stopper configured to implement blocking at a joint between the box body II and a box body III or box body IV adjacent to the box body II;

driving, after the box body II of the box blank is fixed to the box blank shaping station, the fixedly sucked box body I to move along a curved trajectory relative to the box body II;

opening and shaping the box blank after the box body I is moved to a predetermined position along the curved trajectory relative to the box body II; and after the box blank is opened and shaped, releasing and conveying the box body I and the box body II backward along a shaped-box blank conveying path, wherein the box blank shaping station is located at a front end of the shaped-box blank conveying path, and the stopper is configured to prevent displacement of the box body II along the shaped-box blank conveying path.

* * * * *